April 17, 1928.

J. KLEE ET AL 1,666,455

LIFTING JACK FOR VEHICLES

Filed Sept. 2, 1925

Josef Klee
Alfons Schneider
INVENTORS

Their ATTORNEY.

Patented Apr. 17, 1928.

1,666,455

UNITED STATES PATENT OFFICE.

JOSEPH KLEE AND ALFONS SCHNEIDER, OF MUNICH, GERMANY.

LIFTING JACK FOR VEHICLES.

Application filed September 2, 1925, Serial No. 54,083, and in Germany July 7, 1925.

The invention relates to lifting jacks for vehicles, especially motor cars. One of its objects is to provide a jack having improved means for fixing it to the vehicle, and another object is to provide a jack having means whereby it is automatically stopped and thrown over at the end of the lifting and lowering operations.

The improved jack may be actuated by mechanical, pneumatic, hydraulic or electric power.

The invention is illustrated in the accompanying drawing, showing as example an apparatus, actuated by mechanical power.

Figure 1:
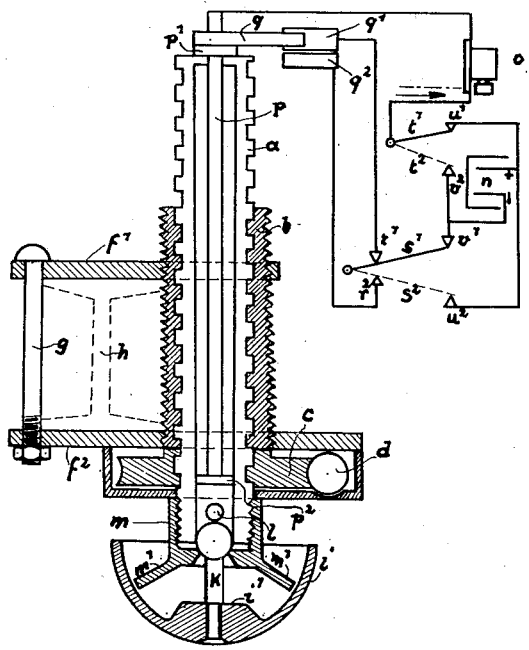
Fig. 1 is a central sectional view showing the jack attached to an automobile axle.
Figure 2:
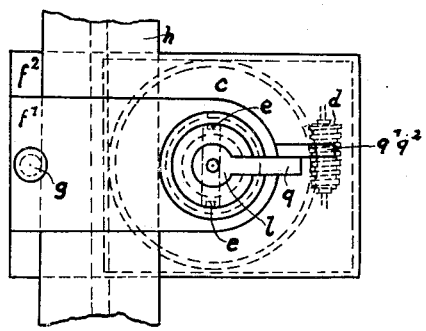
Fig. 2 is a top plan view.

The apparatus shown comprises a hollow screw spindle $a$, which can be rotated in a long sleeve $b$ by means of a worm wheel $c$ and a worm $d$. The worm wheel has splines $e$ (Fig. 2) engaging grooves extending throughout the length of the spindle. In addition to being screw threaded internally, for engaging the spindle $a$, the sleeve $b$ is externally screw-threaded, and two brackets $f^1$, $f^2$ are screwed on to it. These brackets can be adjusted, by screwing, so that they embrace an axle or spring of the vehicle, as indicated at $h$, and their free ends can then be drawn together slightly by means of a bolt $g$, so that they tightly grip the axle or spring, thus enabling the jack to be fixed firmly to the vehicle, without requiring any screw holes or spoiling any part of the vehicle. It will be understood that the size of the axle $h$ is a function of the car weight, the section being comparatively high in heavy cars. Therefore, the clearance between the brackets $f^1$, $f^2$, and consequently the distance for which the jack is braced by such brackets, if also a function of the car weight, that is, the bracing becomes the more effective in proportion to the increase in the weight of the car.

The foot of the jack is movable, so that there is no breakage when the jack is erected from an inclined position, and consists of a hemispherical cup $i$ having screwed into it a pin $k$ with a ball at its end, bearing against a rod $l$ in the hollow spindle, and being held against the same by a screw cap $m$ which forms a socket for the ball and through which the pin passes. The base of the cap $m$ is recessed in the vicinity of the ball in order to permit oscillation of the pin $k$. The cap has a flange $m^1$, and the cup $i$ has a boss $i^1$, which limits the extent to which the foot can rock, as the boss lies in the path of the flange $m^1$. With this arrangement there is no great strain on the ball joint, and if the vehicle has been jacked up on a slope its tendency to move is much reduced.

Whether the jack is actuated hydraulically, pneumatically, mechanically or by other means, it is started by means of an electromotor $o$ fed with current from a battery $n$ on the vehicle. This electromotor is switched off and thrown over automatically in the end positions of the spindle. A rod $p$ which is mainly within the spindle but extends out of the same at the top carries at its upper end a contact arm $q$, connected by a wire to one terminal of the electromotor. The rod also has a collar $p^1$, which is lifted by the spindle when the latter reaches its upper end position, so that the contact arm $q$ is pressed against a contact $q^1$, which is connected by way of a switch $r^1$, $s^1$, $v^1$ to the negative terminal of the battery. If the positive terminal of the battery is connected by a throw over switch $t^1$, to the other terminal of the motor by way of a sliding contact $u^1$, the circuit of the latter is thus closed, and the motor actuates the jack. The spindle then moves downwards, while the vehicle is lifted, till the collar thereon strikes a collar $p^2$, at the lower end of the rod $p$. By this means the contact arm $q$ is pulled downwards, away from the contact $q^1$ and onto a contact $q^2$. This breaks the circuit and the spindle stops.

By moving the switch arms $s^1$, $t^1$ to positions $s^2$, and $t^2$ respectively, and into contact with contacts $u^2$ and $v^2$, the contact $q^2$ is connected, by way of a contact $r^2$ and the switch $s^2$, to the positive terminal of the battery, and the motor is connected to the negative terminal. The motor is thus driven in the opposite direction, and the vehicle is lowered, till the spindle reaches the collar $p^1$ and lifts it, to shift the contact arm $q$ to the dead contact $q^1$. Throwing over the levers $s$ and $t$, you may start the jack working again and again.

What we claim as our invention and desire to secure by Letters Patent of the United States is:—

1. A vehicle jack comprising a tubular casing, a threaded spindle adapted to engage the thread on the inside of said casing, means for rotating said spindle, a thread on the outside of said casing, and brackets defining threaded holes seated on said casing and adapted to engage between them a part of the vehicle.

2. A vehicle jack comprising a tubular casing, a threaded spindle adapted to engage the thread on the inside of said casing, a base plate on the lower end of said spindle, means for rotating said spindle arranged intermediate said spindle and said base plate, a thread on the outside of said casing, and brackets defining threaded holes seated on said casing and adapted to engage between them a part of the vehicle.

In witness whereof we have signed this specification.

JOSEPH KLEE.
ALFONS SCHNEIDER.